(12) United States Patent
Moore et al.

(10) Patent No.: US 10,698,724 B2
(45) Date of Patent: Jun. 30, 2020

(54) MANAGING SHARED RESOURCES IN A DISTRIBUTED COMPUTING SYSTEM

(71) Applicant: OSIsoft, LLC, San Leandro, CA (US)

(72) Inventors: Zachary Christian Moore, Chandler, AZ (US); Ryan Michael Gilbert, Phoenix, AZ (US); Ahanuf Tahamid Hossain, Scottsdale, AZ (US); Thomas Foss Seymour, Danville, CA (US)

(73) Assignee: OSIsoft, LLC, San Leandro, CA (US)

( * ) Notice: Subject to any disclaimer, the term of this patent is extended or adjusted under 35 U.S.C. 154(b) by 232 days.

(21) Appl. No.: 15/950,031

(22) Filed: Apr. 10, 2018

(65) Prior Publication Data

US 2019/0310877 A1    Oct. 10, 2019

(51) Int. Cl.
| | |
|---|---|
| *G06F 9/46* | (2006.01) |
| *G06F 9/50* | (2006.01) |
| *G06F 9/52* | (2006.01) |
| *G06F 11/14* | (2006.01) |
| *G06F 9/30* | (2018.01) |
| *G06F 11/00* | (2006.01) |
| *H04L 29/08* | (2006.01) |

(52) U.S. Cl.
CPC ............ *G06F 9/466* (2013.01); *G06F 9/3004* (2013.01); *G06F 9/30087* (2013.01); *G06F 9/50* (2013.01); *G06F 9/52* (2013.01); *G06F 9/524* (2013.01); *G06F 11/00* (2013.01); *G06F 11/1474* (2013.01); *H04L 67/10* (2013.01); *H04L 67/1002* (2013.01); *G06F 9/467* (2013.01); *G06F 9/5083* (2013.01)

(58) Field of Classification Search
None
See application file for complete search history.

(56) References Cited

U.S. PATENT DOCUMENTS

| | | |
|---|---|---|
| 8,560,581 B2 | 10/2013 | Aronovich et al. |
| 2007/0162520 A1 | 7/2007 | Petersen et al. |
| 2008/0154980 A1 | 6/2008 | Lorenz et al. |

(Continued)

OTHER PUBLICATIONS

PCT International Search Report and Written Opinion, PCT Application No. PCT/IB2018/055020, dated Nov. 28, 2018, 13 pages.

*Primary Examiner* — Qing Yuan Wu
(74) *Attorney, Agent, or Firm* — Fenwick & West LLP (57) ABSTRACT

A distributed computing system includes several partitions that each contain a separate copy of shared resources that receive modifications via behaviors and transactions specified by a user. The transaction manager performs the requested behavior or transaction in parallel on each copy of the shared resources as indicated by a resource ID. This allows the distributed computing system to operate in parallel without competing for the same shared resource, avoiding deadlocks and race conditions. If a behavior or transaction fails while modifying a copy of a shared resource, the transaction manager prevents the behavior or transaction from modifying the remaining copies and preempts results from the failed behavior or transaction. The transaction manager reestablishes a consistent state across shared resources by rolling back the failed behavior or transaction, reverting each copy of the shared resources to its state prior to executing the behavior or transaction.

20 Claims, 10 Drawing Sheets

(56) References Cited

U.S. PATENT DOCUMENTS

| | | |
|---|---|---|
| 2009/0064141 A1 | 3/2009 | Wecker |
| 2017/0161095 A1 | 6/2017 | Horsnell et al. |
| 2018/0295159 A1* | 10/2018 | Avidan Herman ..... G06F 9/466 |
| 2019/0004851 A1* | 1/2019 | Doshi ..................... G06F 9/467 |

* cited by examiner

MANAGING SHARED RESOURCES IN A DISTRIBUTED COMPUTING SYSTEM

BACKGROUND

Field of Disclosure

This disclosure relates to the field of managing shared resources across separate partitions of a distributed computing system.

Description of the Related Art

Parallel computing allows a computing system to optimize its performance by dividing processes into parts that execute simultaneously on separate processors within the computing system. Typically, subtasks in a parallel computing environment are performed by multiple threads that often need to use or update variables shared between them. Because these variables are shared amongst all threads performing subtasks, locks may be used to ensure that competing threads do not overwrite or otherwise modify common data needed by each subtask. However, the use of locks can present several challenges associated with the execution of each subtask, including deadlocks and race conditions. Often when a deadlock occurs, the competing subtasks are aborted, resulting in lost work and inefficiency as the subtasks must start over again.

SUMMARY

Described embodiments include a transaction manager for managing shared resources in a distributed computing system. The distributed computing system includes several partitions that each contain a separate copy of the shared resources that may receive modifications via behaviors and transactions as specified by a user. Each behavior can modify one shared resource at a time, and includes a resource ID that indicates which resource it is to modify. The transaction manager performs the requested behavior or transaction in parallel on each copy of the shared resources in each of the partitions to maintain a consistent state across partitions. In addition, using resource IDs to specify which shared resources will be modified by behaviors and transactions allows the distributed computing system to choreograph the modification of each resource in parallel such that behaviors do not compete for the same shared resource, thus avoiding deadlocks and race conditions.

In the event that a behavior or transaction fails while modifying a copy of a shared resource, the transaction manager prevents the behavior or transaction from modifying the remaining copies and preempts results from the failed behavior or transaction. Additionally, the transaction manager reestablishes a consistent state across shared resources by rolling back the failed behavior or transaction, thus reverting each copy of the shared resources to its state prior to executing the behavior or transaction.

The features and advantages described in this summary and the following detailed description are not all-inclusive. Many additional features and advantages will be apparent to one of ordinary skill in the art in view of the drawings, specification, and claims hereof.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

DETAILED DESCRIPTION

The methods described herein address the technical challenge of performing operations on shared resources within a distributed computing system. Performing operations with shared resources may introduce incorrect data as several components of a distributed computing system compete for the same resources, and potentially modify the resources such that they are left in inconsistent states. Because the resources are shared, these inconsistent states may propagate incorrect data throughout an entire distributed computing system to be used in subsequent processes. In addition, multiple components that compete for a shared resource can often result in a deadlock scenario which impedes the progress of the overall system. The disclosed method provides a transaction manager framework that allows users to modify separate copies of shared resources distributed across multiple partitions while maintaining a consistent state. In addition, using multiple partitions that contain copies of the same shared resources affords complex transactions that are able to execute concurrently across partitions while avoiding deadlock.

Distributed Computing System

Figure 1:
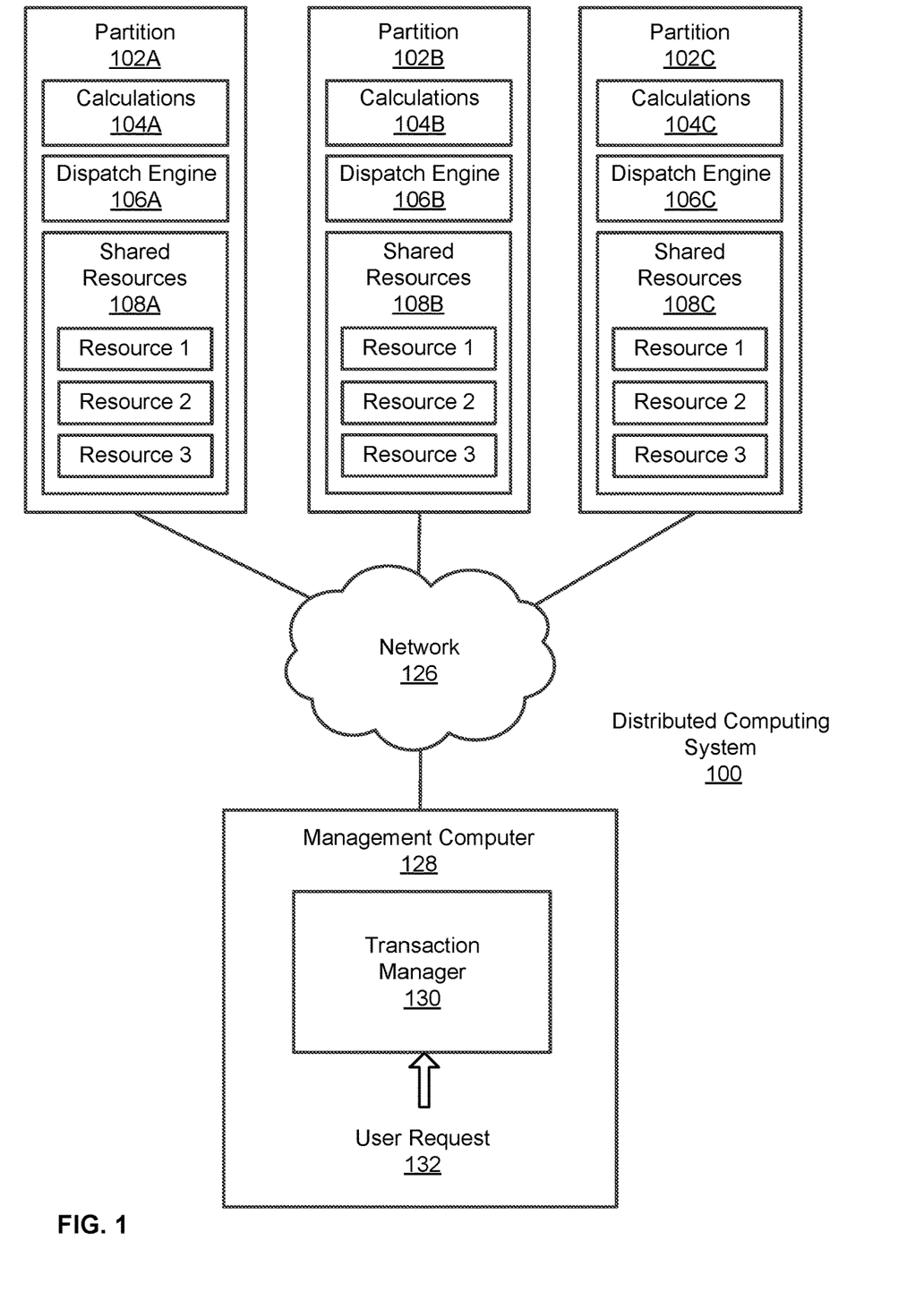
FIG. 1 is a block diagram illustrating a distributed computing system in accordance with one embodiment.

FIG. 1 is a block diagram illustrating an embodiment of a distributed computing system 100. The distributed computing system 100 includes several partitions 102A-C (individually referred to herein as "partition 102"), a management computer 128, and a network 126. Each partition 102 includes a separate set of calculations 104A-C and dispatch engines 106A-C (individually referred to herein as "calculation 104" and "dispatch engine 106," respectively), in addition to several copies of shared resources 108A-C (individually referred to herein as "shared resource 108") distributed across each of the partitions 102A-C. The management computer 128 includes a transaction manager 130 that receives one or more user requests 132 generated by a user of the distributed computing system 100.

In one embodiment, the partitions 102A-C are servers that each perform individual calculations 104A-C comprising a portion of a distributed load. Each partition 102 of the distributed computing system 100 includes its own copy of shared resources 108A-C. The partitions 102A-C use the shared resources 108A-C for performing calculations 104A-C. For example, if a user wishes to perform calculations to determine the maintenance schedules for a fleet of 1,000 trucks, each partition 102A-C can use the shared resources 108A-C to reference instances of each truck and divide the calculations 102A-C accordingly. Because each partition includes a copy of the same shared resources 108A-C, any operations requested by a user to create new instances of a resource, read a resource, update an existing resource, and/or delete an existing resource, referred to herein as "CRUD operations," must additionally be made to each of the copies of the shared resources across all other partitions 102A-C. The partitions 102A-C are managed by the transaction manager 130 to ensure that any CRUD operations executed on one partition 102 are similarly applied to each copy of the shared resources 108A-C on the remaining partitions 102A-C in order to maintain a consistent state among all copies of shared resources 108A-C.

The shared resources 108A-C are objects that may receive modification through CRUD operations requested by a user via user request 132, or are used for individual calculations 104A-C specific to a given partition 102 triggered by the dispatch engine 106. In the example embodiment illustrated in FIG. 1, the shared resources 108A-C include resources 1-3, in which resource 1 is a script, resource 2 is a template, and resource 3 is a schedule. Other embodiments may include additional or fewer shared resources, and/or different resources than those specified herein.

Assume for purposes of this example that the script is a block of code (e.g., JavaScript) defined by a user that instructs each partition 102 how to perform calculations 104A-C and/or modify shared resources through CRUD operations. For example, new instances of scripts may be created by a user through user requests 132 that instruct the transaction manager 130 to "create" a script. Similarly, scripts may be updated to a new state in response to providing the transaction manager 130 with a user request 132 to "update" the scripts. Scripts may additionally be deleted via a "delete" user request 132. However, if any copies of the script fail to complete a modification, the transaction manager reverts the state of each script across all partitions 102A-C to the state of the script prior to receiving the failed CRUD instruction.

The template is a metadata object that contains a script, in addition to aliases used by the script which allow users to define general application scripts rather than generating a new script for each calculation 104. For example, if a user wants to determine the mileage of a certain truck out of the fleet of trucks, the user can define a template that calculates the mileage for a single truck using an alias such as "mileage" and creating an instance of this template (e.g., a calculation) for each truck. Templates may reside in either an active or inactive state. Because templates contain aliases used by scripts, they must be in an inactive state before CRUD operations may be performed on them.

The schedule indicates when calculations 104A-C are to be executed by the partitions 102A-C (e.g., on a daily basis, hourly basis, weekly basis, and the like). Each partition 102 executes its own set of calculations 104A-C based on its specified schedule. In order for a user to perform CRUD operations on schedules, modifying operations must also be applied to templates.

Shared resources 108A-C may be modified through CRUD operations, called "behaviors." A behavior is a unit of work that a user wishes to perform using a single shared resource, such as updating a script or deleting a template, for example. Each behavior modifies only one shared resource 108A-C at a time, and includes a resource ID that indicates which resource it modifies. In addition, each behavior is assigned a behavior ID that serves as a unique identifier for each behavior received by the transaction manager 130. Because shared resources 108A-C are capable of returning to a previous state prior to receiving modification, behaviors also support a "do action" and an "undo action." The do action indicates a CRUD operation that the behavior is to perform, such as creating a script, updating a template, or deleting a schedule for example. The undo action reverts the state of a shared resource 108A-C to that prior to the execution of the do action, such as a delete operation following a create operation. In this way, a given behavior may be rolled back if it fails to successfully modify a shared resource 108A-C.

CRUD operations that may be applied to several shared resources 108A-C at one time are called "transactions." A transaction is a collection of behaviors that represent a logical unit of work. If one behavior of the transaction fails to successfully modify a shared resource 108, the transaction manager 130 prevents the remaining behaviors of the transaction from executing. For example, if a transaction including "update template" and "delete script" instructions initially fails to update the template, the transaction manager 130 preempts the failed transaction from deleting the script. In this case, any behaviors that have already performed in the failed transaction are rolled back to revert the shared resource 108 to its previous state prior to the execution of the transaction.

The partitions 102A-C and management computer 128 are configured to communicate via the network 126 shown in FIG. 1, which may comprise any combination of local area and/or wide area networks, using both wired and/or wireless communication systems. In one embodiment, the network 126 uses standard communications technologies and/or protocols. For example, the network 126 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 126 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 126 may be represented using any suitable format, such as hypertext markup language (HTML) or extensible markup language (XML). In some embodiments, all or some of the communication links of the network 126 may be encrypted using any suitable technique or techniques.

The user request 132 is a request generated by a user of the management computer 128 instructing the transaction manager to execute a behavior, transaction, or calculation 104 on a shared resource 108A-C. The transaction manager 130 creates a new instance of a behavior, transaction, or calculation 104 for each user request 132 received. For example, if the transaction manager 130 receives two consecutive user requests 132 to update a script, the transaction manager 130 assigns each request a separate behavior ID so that the lifecycle of each behavior may be monitored accordingly.

The transaction manager 130 receives requests to modify shared resources stored in the partitions 102A-C of the distributed computing system 100, and instructs each partition 102 to modify its own copy of the shared resource 108 based on the received requests. Each partition 102 operates on the shared resources 108A-C in parallel. Because the shared resources 108A-C that will receive modification are identified before the behaviors and/or transactions are executed, the transaction manager 130 can choreograph the modification of each resource across partitions 102A-C such that behaviors and/or transactions do not compete for the same shared resource 108. Coordinating behaviors and transactions in this manner allows for parallel performance while avoiding deadlocks and race conditions. In the event a behavior or transaction fails to execute properly using a given shared resource 108, the transaction manager 130 reverts the state of the resource to its state prior to executing the behavior or transaction.

Transaction Manager Framework

Figure 2:
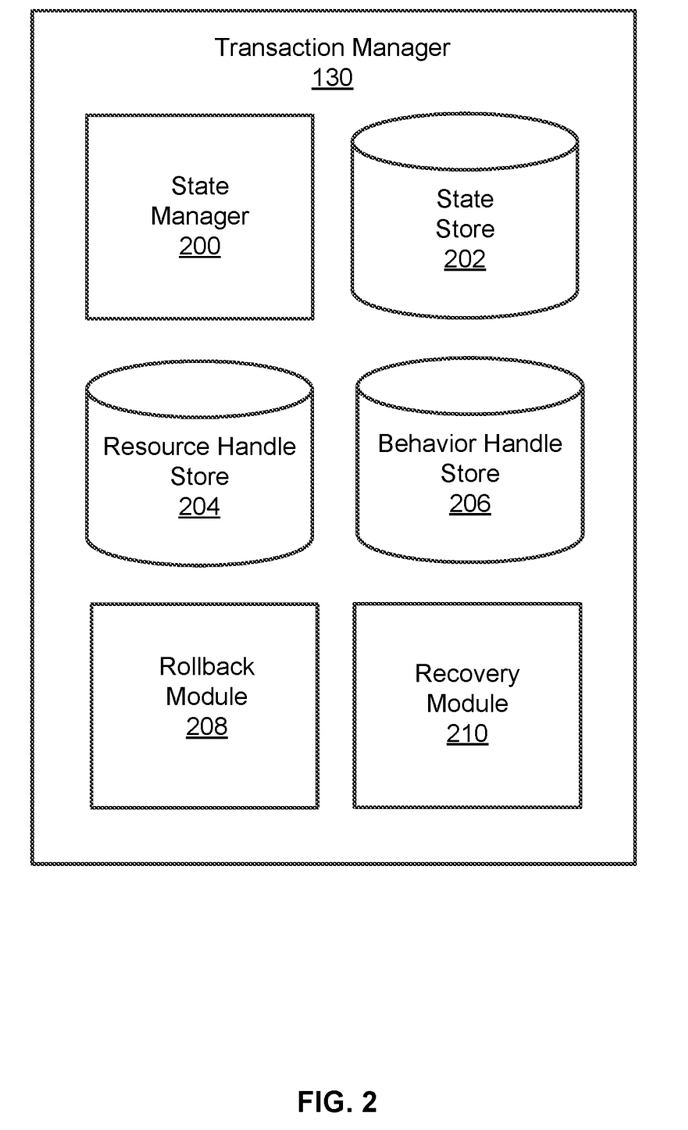
FIG. 2 is a block diagram illustrating a transaction manager in accordance with one embodiment.

FIG. 2 is a block diagram illustrating a transaction manager 130 according to one embodiment. In the embodiment illustrated in FIG. 2, the transaction manager 130 includes a state manager 200, a state store 202, a resource handle store 204, a behavior handle store 206, a rollback module 208, and a recovery module 210. In other embodiments, the transaction manager 130 may include additional, fewer, or different components for various applications. Conventional components such as network interfaces, security functions, load balancers, failover servers, management and network operations consoles, and the like are not shown so as to not obscure the details of the system architecture.

The state manager 200 provides the transaction manager 130 access to shared resources 108A-C so that they may be modified through transactions and behaviors. The state manager 200 provides this access by generating resource handles. Each resource handle serves as a representation of a shared resource 108 stored in the partitions 102A-C of the distributed computing system 100, and includes a behavior stack used for modifying the shared resource 108. Each resource handle has its own resource lock. Before gaining access to the behavior stack associated with a shared resource, the transaction manager 130 must enter a resource lock to prevent other behaviors from entering the behavior stack while a resource is being modified. In one embodiment, the behavior stack operates as a last-in-first-out (LIFO) stack to which behaviors are added, performed, or rolled back in LIFO order. There is exactly one behavior stack for each of the shared resource 108. However, transactions may operate on several behavior stacks at a given time to coordinate a collective transaction of behaviors. When the transaction manager 130 completes each transaction or behavior associated with a given behavior stack, the transaction manager 130 releases the resource lock and the state manager 200 releases the resource handle from memory, effectively ending the transaction. The state manager 200 stores resources handles in the resource handle store 204 when they are in use.

The state store 202 is used by the transaction manager 130 to maintain an inventory of the various states of shared resources 108A-C throughout a given transaction. The state store 202 retains information describing the execution of a behavior that the transaction manager 130 can use to determine the stability of shared resources 108A-C that were modified by the behavior. For example, if a behavior is set for recovery after failing a rollback operation, the transaction manager 130 marks the behavior as unstable and the state store 202 maintains a record of the behavior's instability. In one embodiment, the state store 202 is defined and implemented by the user. In other embodiments, the state store 202 is maintained and implemented by the transaction manager 130.

The behavior handle store 206 is used for storing behavior handles generated by the transaction manager 130. Each behavior handle in the behavior handle store 206 serves as a representation of a behavior received by the transaction manager 130 in a user request 132. Behavior handles are used with resource handles to modify shared resources 108A-C stored in the partitions 102A-C. The transaction manager 130 executes behaviors on shared resources 108A-C by adding the corresponding behavior handle to the behavior stack of the resource handle it is to modify. Once executed, the shared resource 108 stored in the partitions 102A-C that corresponds to the resource handle is modified, and the behavior handle is removed from the behavior stack in LIFO order. Behavior handles may only be removed from the stack once the behavior handle is committed by the user, the behavior handle is invalidated, or the behavior handle is rolled back by the rollback module 208.

The transaction manager 130 can identify details regarding the state of behaviors based on their behavior handles. For example, behavior handles can indicate if a behavior has been requested for rollback, if a rollback has been attempted, if a rollback or recovery operation has completed successfully, if a behavior has been committed, if a behavior has been invalidated, if the behavior is recovering from a failed rollback, if the lifecycle of the behavior has completed, and if the behavior is stable. In one embodiment, a behavior may only be qualified as stable if the behavior has not performed a failed rollback or if the behavior has recovered from a failed rollback. Rollback and recovery of behaviors are discussed in greater detail in the following section.

The rollback module 208 identifies behavior handles that have failed to successfully execute on the behavior stack of a given resource handle, and attempts to restore the resource handle to the state it was in prior to the failed execution. Behavior handles designated for rollback are not removed by the rollback module 208 until the rollback is successfully processed or the behavior handle is invalidated (further discussed with reference to FIG. 5B). The rollback module 208 may only perform a rollback operation on a stable behavior handle that is located at the top of the behavior stack. Because the transaction manager 130 enters a resource lock before making modifications to a resource, the rollback module 208 processes rollbacks on the behavior stack to guarantee that other behaviors operating on the same shared resource 108A-C enter a deadlock, a race condition, or interfere with the expected state of the distributed computing system 100. The rollback module 208 sends a signal to the transaction manager 130 that indicates if the rollback was a success or a failure. If the rollback module 208 fails to properly rollback a failed behavior handle, the transaction manager 130 must attempt a recovery operation.

The recovery module 210 manages the recovery of a behavior handle that has failed to properly rollback and is left in an inconsistent state on a behavior stack. The recovery module 210 monitors whether or not a recovery task has completed successfully thus reverting the behavior handle back to a consistent state, and returns a signal indicating either a successful recovery or a failed recovery. In the event of a successful recovery, the lifecycle of the inconsistent behavior handle will end as it is removed from the behavior stack. An unsuccessful recovery may require manual intervention from a user.

Process for Executing Transactions

Figure 3A:
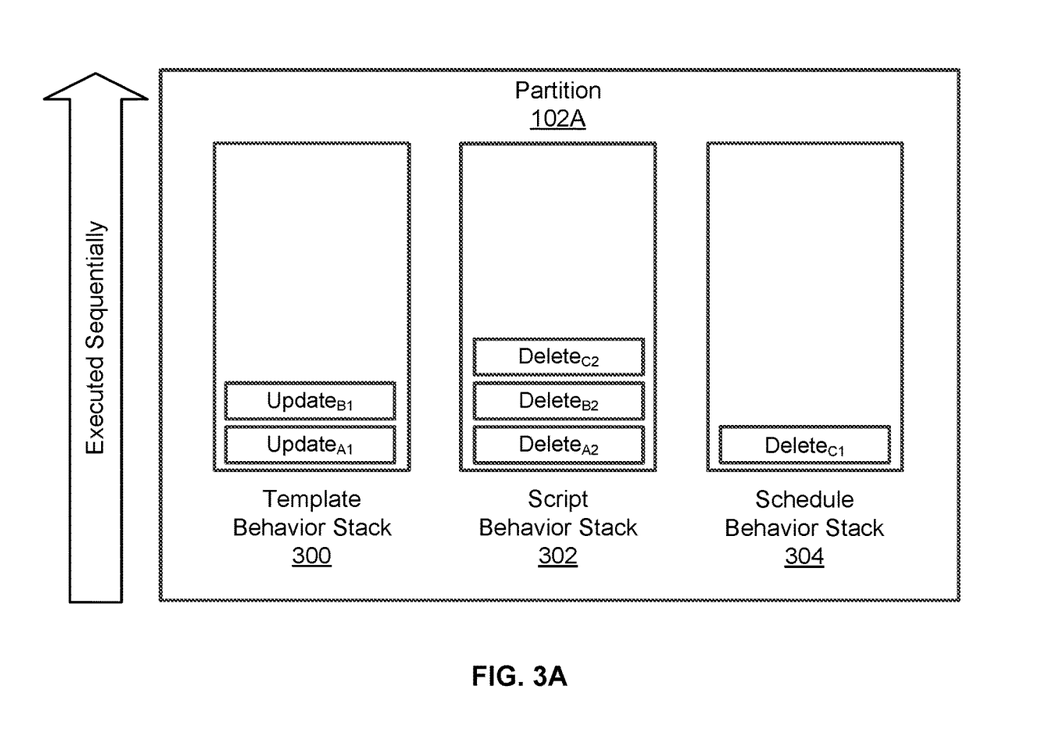
FIGS. 3A and 3B illustrate an example process for managing transactions in accordance with one embodiment.

FIG. 3A illustrates an example process for managing transactions in a distributed computing system 100, according to one embodiment. Transactions that modify shared resources 108A-C are typically executed on each partition 102A-C to achieve a consistent state in each copy of a shared resource 108 being modified by a transaction. However, in the example shown in FIG. 3A, only one partition is shown for clarity. In this example, the transaction manager receives a user request 132 to delete a script. Given that template resources contain scripts, as well as aliases used by scripts, the transaction manager must also set the template resource to an inactive state prior to deleting the script. This is done to guarantee that no other script resources are using the template as it is being modified. The transaction manager acquires resource handles for the template and script resources that include a template behavior stack 300 and a script behavior stack 302, respectively. The template behavior stack 300 and script behavior stack 302 allow the transaction manager 130 to access the template and script resources, and to modify both resources according to the requested transactions.

The transaction manager 130 generates two behavior handles: a first behavior handle to modify the template to make it inactive (e.g., an update operation), and a second behavior handle to delete the script. These behavior handles are shown in FIG. 3A as an "Update$_{A1}$" behavior handle and a "Delete$_{A1}$" behavior handle, where the subscript indicates the order in which they execute within transaction A. Before executing transaction A, the transaction manager 130 records the state of each resource in order to rollback to the current state in the event of a failed transaction. For example, if the Update$_{A1}$ behavior handle executed successfully by effectively deactivating the template, but the Delete$_{A2}$ behavior handle failed, transaction A would fail as a collective transaction. In this example, the rollback module 208 can use the recorded state information prior to the failed execution of transaction A to restore the template and script resources to their previous states.

Figure 3B:
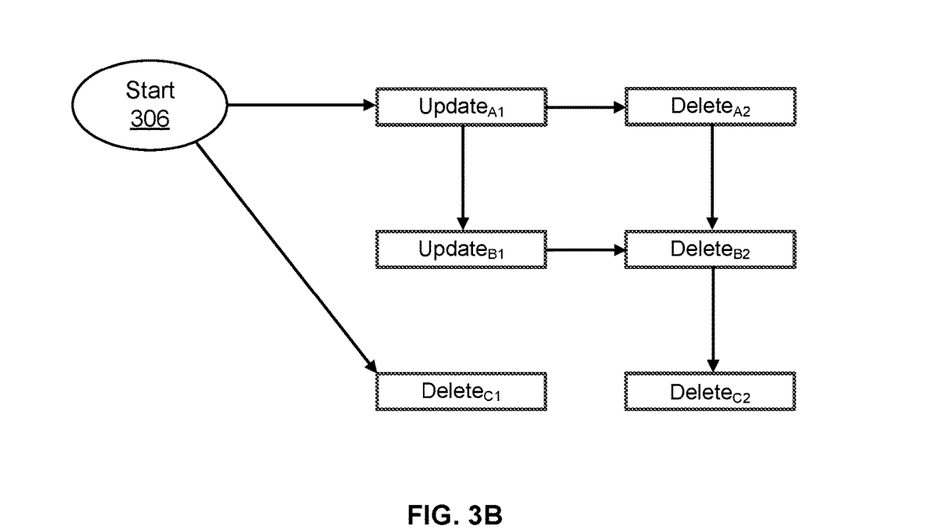

FIG. 3B is a flowchart illustrating an example execution order for executing the transactions shown in FIG. 3A, according to one embodiment. In the embodiment illustrated in FIG. 3B, transactions A and C begin executing first due to their location at the bottom of their respective behavior stacks. In general, behavior handles that are located at the bottom of their behavior stacks may execute concurrently if they do not have dependencies with one another within the same transaction. In addition, behavior handles on the same behavior stack must execute sequentially, beginning with the behavior handle located at the bottom of the behavior stack and subsequently processing the behavior handles above until the top of the behavior stack is reached. This is shown in FIG. 3B where the transactions start 306 by executing Update$_{A1}$ and Delete$_{C1}$. Although behavior handles Update$_{A1}$ and Delete$_{A2}$ are located at the bottom of their respective behavior stacks, behavior handle Delete$_{A2}$ depends on behavior handle Update$_{A1}$ and must wait for its completion before executing. However, behavior handle Delete$_{C1}$ on the schedule behavior stack 304 does not depend on Delete$_{C2}$ on the script behavior stack 302, and can begin executing. However, even if Delete$_{C1}$ on the schedule behavior stack 304 successfully completes its execution before transactions A and B complete their respective executions, Delete$_{C2}$ on the script behavior stack 302 must wait to execute until transactions A and B have successfully completed given that Delete$_{A2}$ must wait for Update$_{A1}$ and Delete$_{B2}$ must wait for Update$_{B1}$.

Process for Executing Behaviors

Figure 4A:
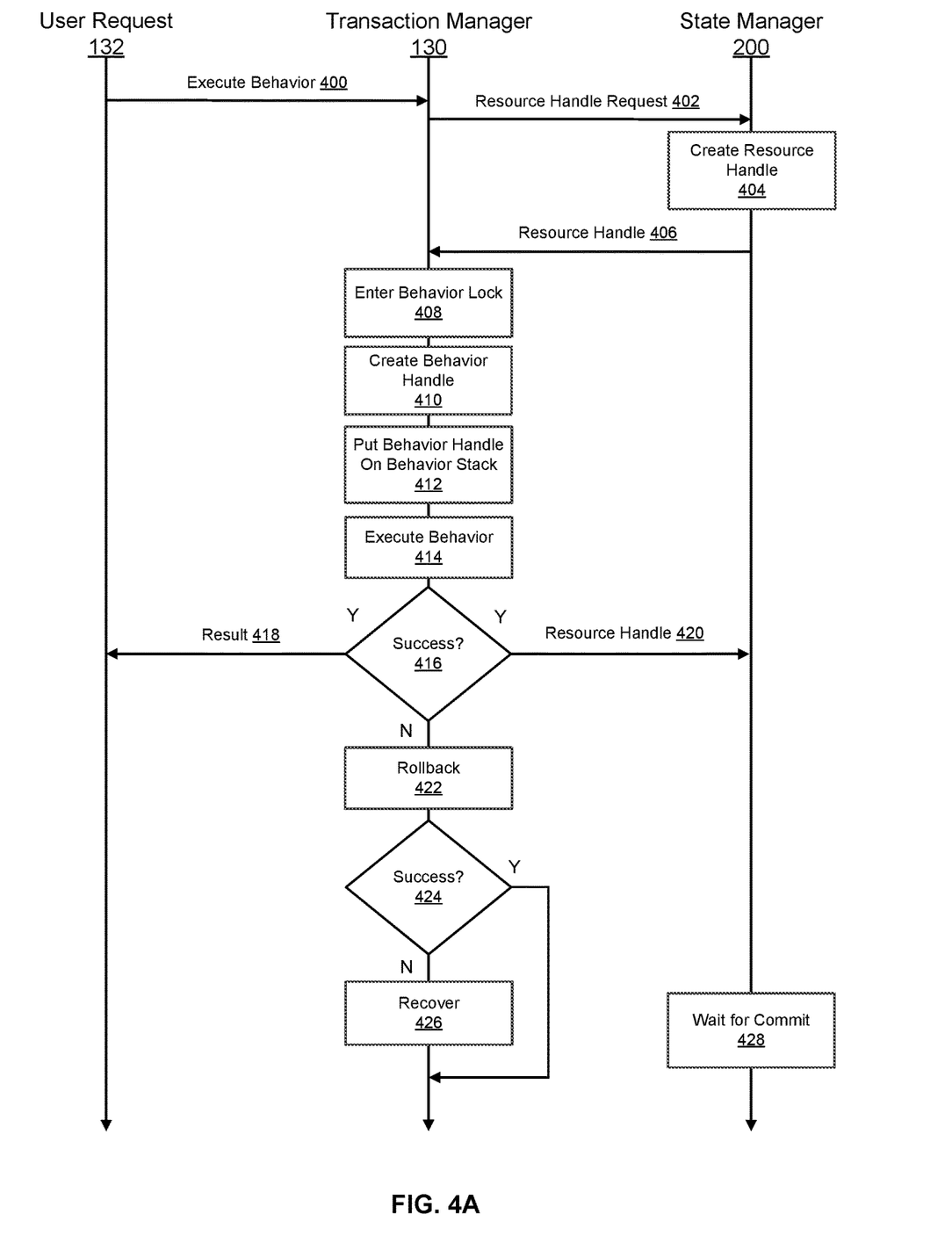
FIGS. 4A and 4B are relationship diagrams illustrating interactions between a user request, a transaction manager, and a state manager in accordance with one embodiment.

FIG. 4A is a relationship diagram illustrating a process for modifying a shared resource 108, according to one embodiment. In the embodiment illustrated in FIG. 4A, the transaction manager receives an instruction to execute behavior 400 from a user request, and sends a resource handle request 402 to the state manager to acquire access to the shared resource 108 to be modified. The state manager creates 300 the resource handle for the requested shared resource and sends 406 the resource handle to the transaction manger. The transaction manager enters 408 a behavior lock for the resource handle and creates 410 a behavior handle that represents the requested behavior. The transaction manager puts 412 the behavior handle on the behavior stack corresponding to the shared resource it is to modify. The transaction manager executes 414 the behavior. If the behavior has a successful 416 execution, the transaction manager sends the result 418 to the user that generated the user request and informs 420 the state manager that it no longer needs the resource handle. The state manager waits 428 for the user to commit the behavior handle before releasing the resource handle from memory. However, if the performed behavior was not a success 416, the rollback module attempts to rollback 422 the behavior. If the rollback is a success, the transaction manger is done, the unsuccessful behavior handle is removed from the behavior stack, and the shared resource reassumes the state it held prior to the execution of the behavior handle. If the rollback is unsuccessful, the recovery module must attempt to recover 426 the previous state of the shared resource before the requested behavior was performed.

Figure 4B:
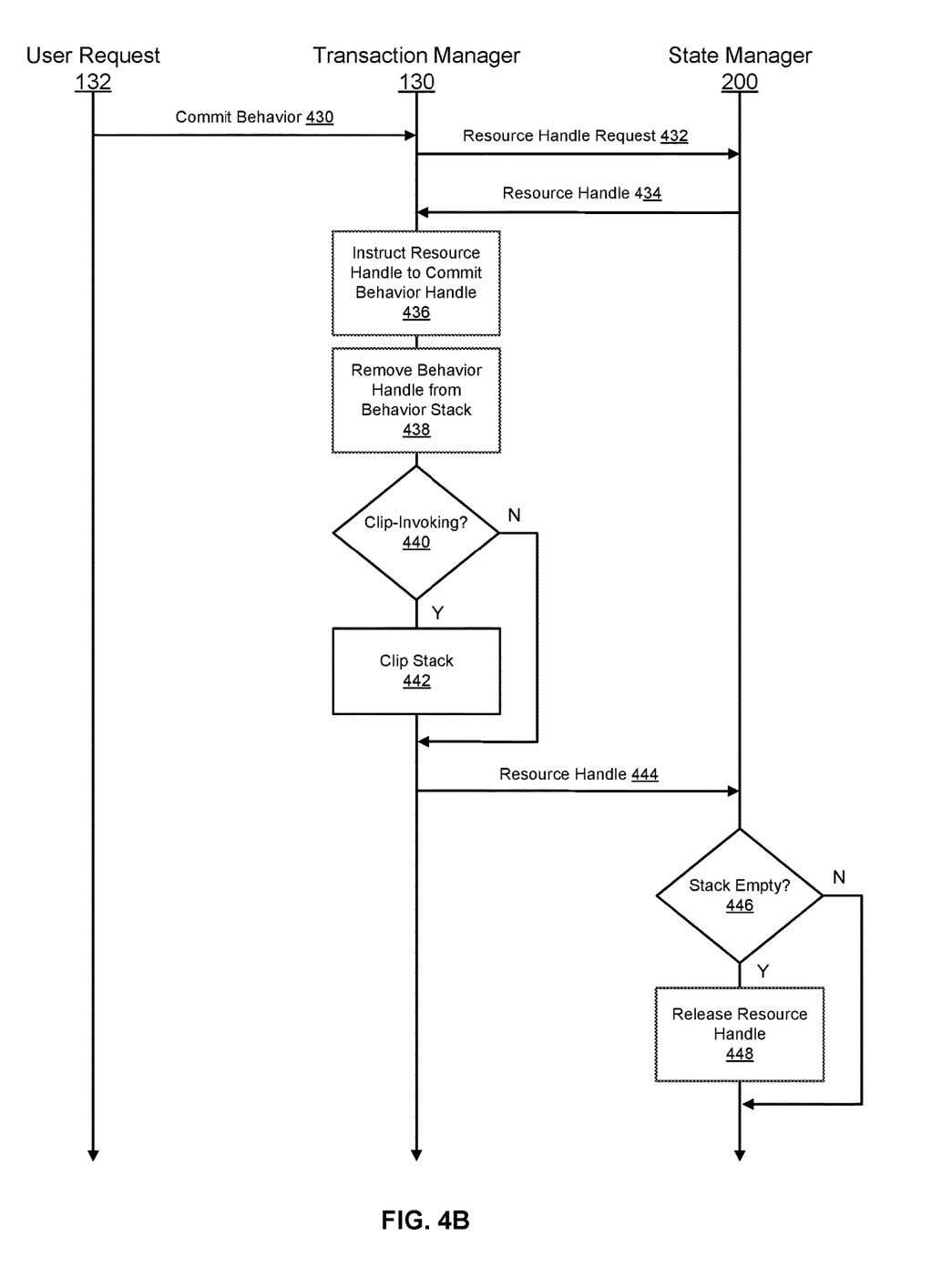

FIG. 4B is a relationship diagram illustrating a process for committing a successfully executed behavior handle on a behavior stack, according to one embodiment. In the embodiment shown in FIG. 4B, the transaction manager receives a commit behavior 426 instruction from a user request, and again sends a resource handle request 432 to the state manager to reacquire the resource handle previously used to access to the shared resource. The state manager sends 434 the resource handle to the transaction manager, and the transaction manager instructs 436 the resource handle to commit the successful behavior handle. Once committed, the state manager removes 438 the behavior handle from the behavior stack and identifies if the behavior handle is clip-invoking 440. If the behavior handle is clip-invoking, the previous state of the behavior handle below is invalidated and clipped 442 from the behavior stack. If the behavior handle is not clip-invoking, it is simply removed from the top of the behavior stack. The transaction manager again informs 444 the state manager that it no longer needs the resource handle. The state manager determines 446 whether or not the behavior stack is empty. If any behavior handles remain on the behavior stack, the state manager does not release the resource handle from memory until each behavior handle has executed successfully, been rolled back, or clipped from the behavior stack. If the behavior stack is empty, the state manager releases 448 the resource handle and awaits the next request.

Processes for Managing a Behavior Stack

Figure 5A:
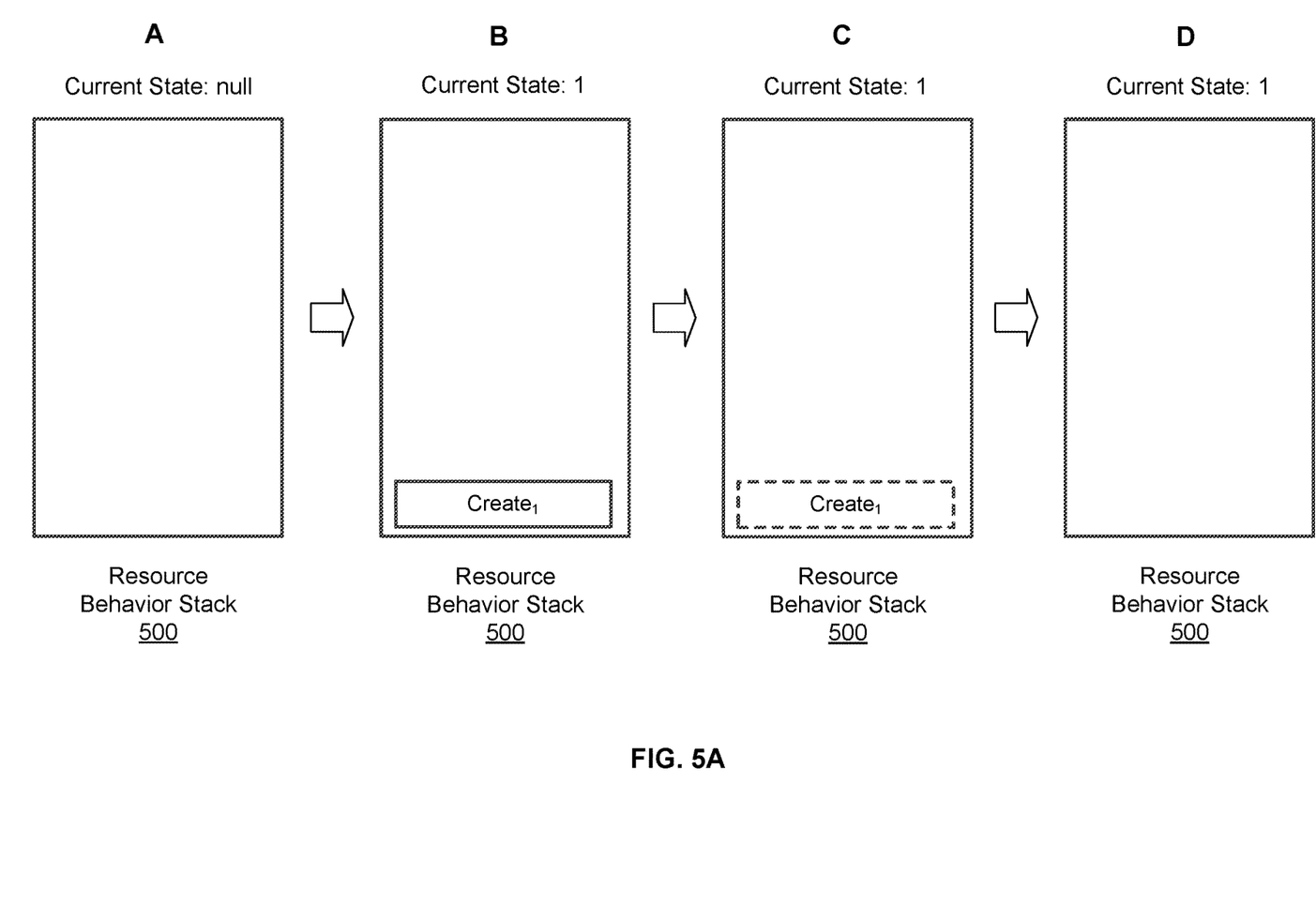
FIG. 5A is a diagram illustrating a process for committing a behavior handle in accordance with one embodiment.
Figure 5B:
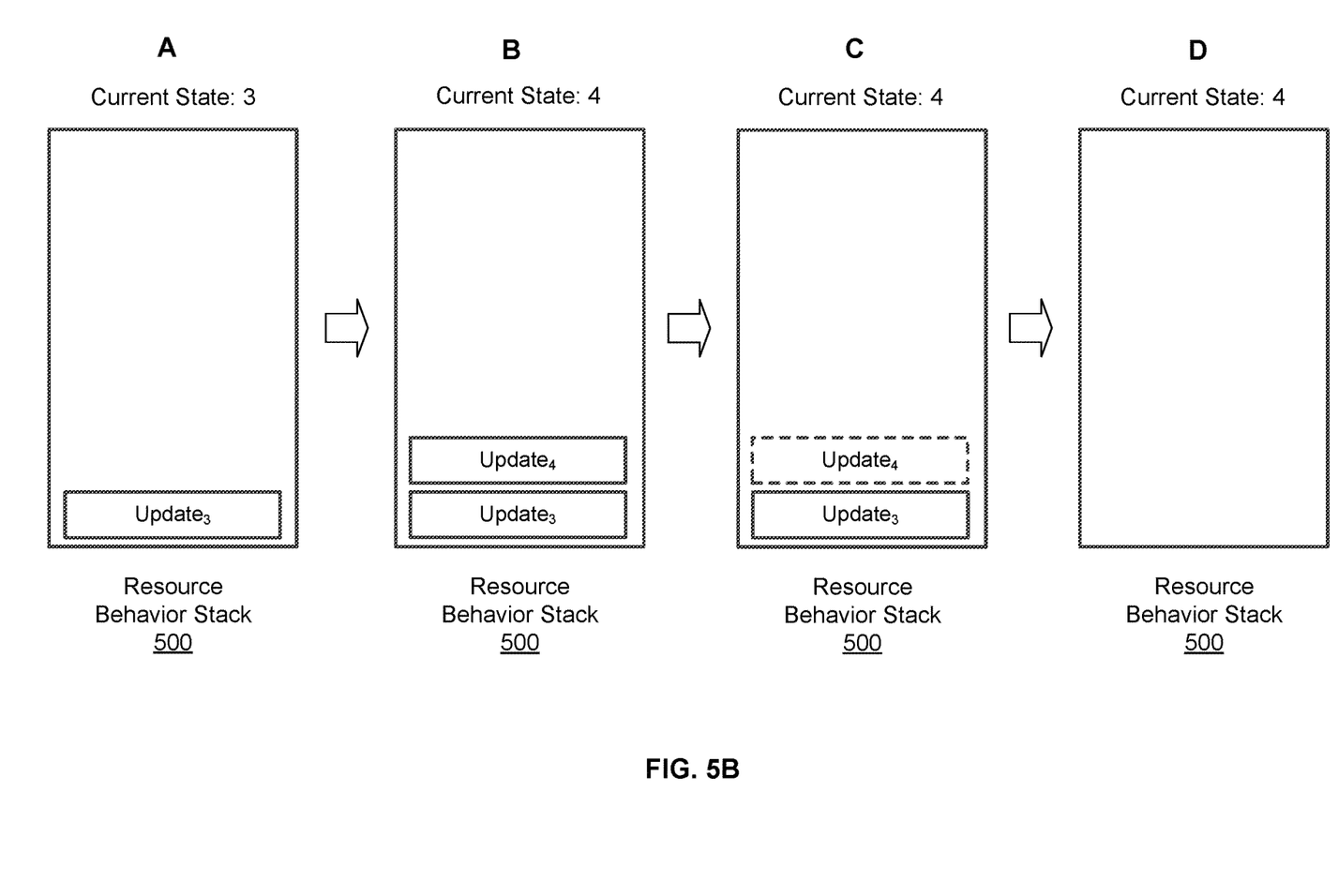
FIG. 5B is a diagram illustrating a process for clipping a behavior stack in accordance with one embodiment.
Figure 6:
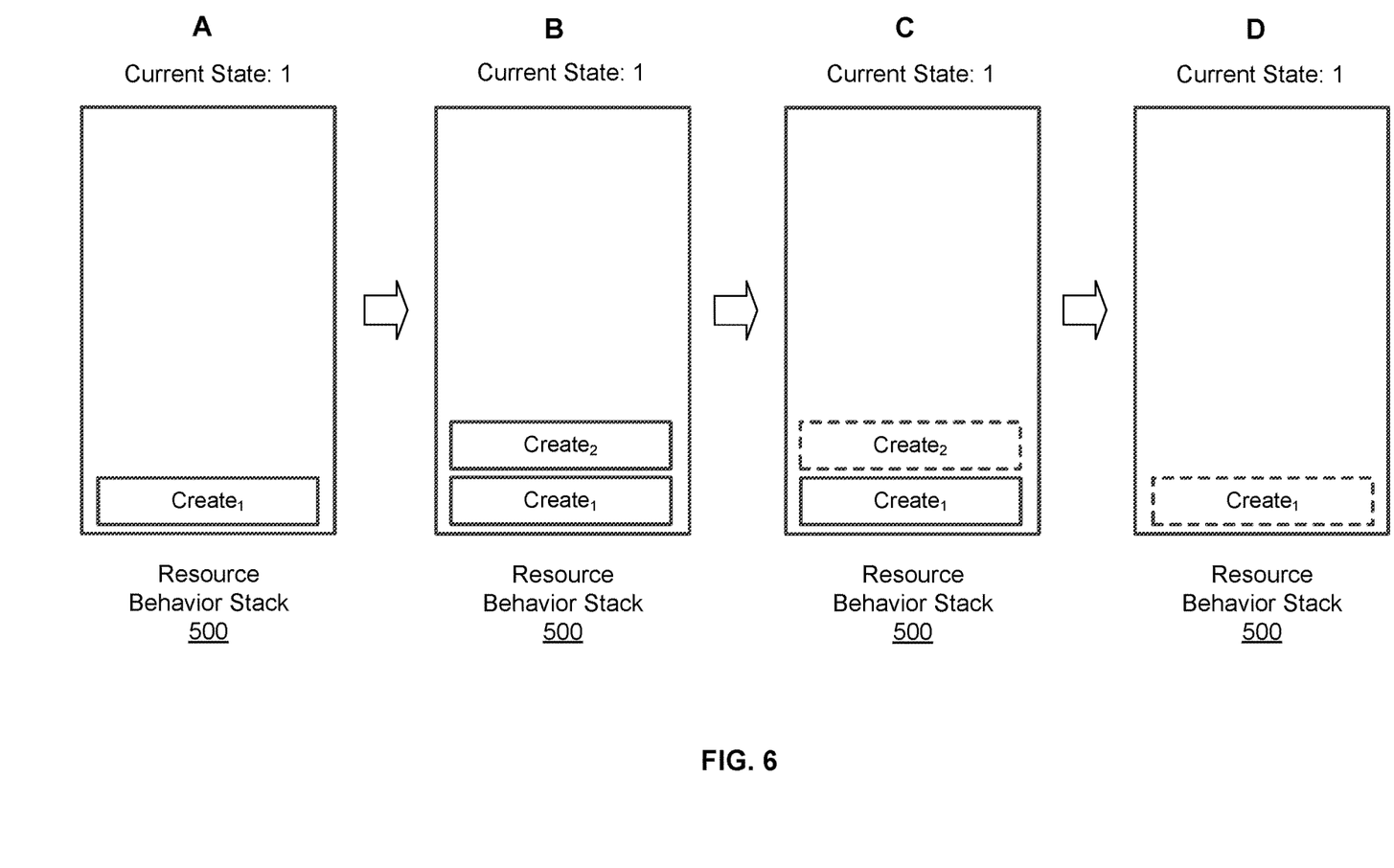
FIG. 6 is a diagram illustrating a rollback operation in accordance with one embodiment.

FIGS. 5A, 5B, and 6 illustrate several processes associated with managing a resource behavior stack corresponding to a shared resource 108 in each partition 102 of the distributed computing system 100. In the following examples, a resource behavior stack is shown on only one partition for simplicity. However, behaviors executed in the following examples would apply to each copy of the shared resource across all partitions in the distributed computing system 100. In each example, the resource behavior stack 500 may correspond to a script behavior stack, a template behavior stack, or a schedule behavior stack.

Process for Committing a Behavior Handle

FIG. 5A illustrates a process for committing a successful behavior handle on a resource behavior stack 500, according to one embodiment. As shown in FIG. 5, the resource behavior stack 500 is empty in step A (i.e., no behavior handles modifying the corresponding shared resource) and its initial state is null. In step B, the resource behavior stack 500 receives a behavior handle requesting to create an instance of the resource and updates the state of the resource behavior stack 500 to state 1. In one or more embodiments, this behavior could correspond to creating a script in a script behavior stack, a template in a template behavior stack, or a schedule in a schedule behavior stack. In step C, the behavior handle has successfully executed, has been committed by the user, and is set to be removed from the resource behavior stack 500 (as indicated by the dotted line). Finally, in step D the successful behavior handle is removed from the resource behavior stack 500 and the current state remains in state 1.

Process for Clipping a Behavior Stack

FIG. 5B illustrates a process for clipping a resource behavior stack 500, according to one embodiment. As shown in step A of FIG. 5B, the resource behavior stack 500 has received a behavior handle instructing the behavior stack to update to state 3, and the resource behavior stack resultantly has a current state of 3. In one or more embodiments, this behavior could correspond to updating a script in a script behavior stack, updating a template in a template behavior stack, or updating a schedule in a schedule behavior stack. However, before the behavior handle is removed from the resource behavior stack 500, another behavior handle arrives to be executed. In step B, the resource behavior stack 500 receives a second behavior handle instructing the behavior stack to again perform an update on the shared resource that corresponds to the resource behavior stack 500. In step C, the second behavior handle executes successfully, updates the resource behavior stack to state 4, and is set to be removed from the resource behavior stack 500 (as indicated by dotted line). Because the second update behavior handle was successful, it is committed and removed from the resource behavior stack 500. However, because the shared resource is currently in state 4, it may be viewed as though the behavior handle updating the resource behavior stack to state 3 was never executed. As such, the transaction manager 130 invalidates the first update behavior handle and clips it from the behavior stack as the second behavior handle is removed. This is illustrated in step D, where the resource behavior stack 500 is again empty and has a current state of 4.

Process for Rolling Back Unsuccessful Behaviors

FIG. 6 illustrates a process for rolling back an unsuccessful behavior handle, according to one embodiment. In step A of the embodiment illustrated in FIG. 6, the resource behavior stack 500 initially has a behavior handle corresponding to a create behavior and has a current state of 1. In step B, the initial create behavior handle has executed, and an additional create behavior handle is added to the resource behavior stack 500. In this step, neither of the create behavior handles have been committed or rolled back, and the second create behavior handle has not yet finished execution, leaving the resource behavior stack 500 in the current state of 1 rather than 2. In step C, the second create behavior handle execution fails because the shared resource referenced by resource behavior stack 500 has already been created by the first create behavior handle. The second create behavior handle is marked for rollback (as shown by the dotted line), and the current state remains at 1. The resource behavior stack 500 is processed by the rollback module 208. Because the second create behavior handle is located at the top of the resource behavior stack 500 and is marked for rollback, it may be rolled back immediately. The rollback module 208 performs a rollback operation on the second create behavior handle and removes it from the resource behavior stack 500. In step D, the first create behavior handle is committed (as shown by the dotted line) and is subsequently removed from the resource behavior stack 500 leaving a current state of 1.

Process for Managing Transactions

Figure 7:
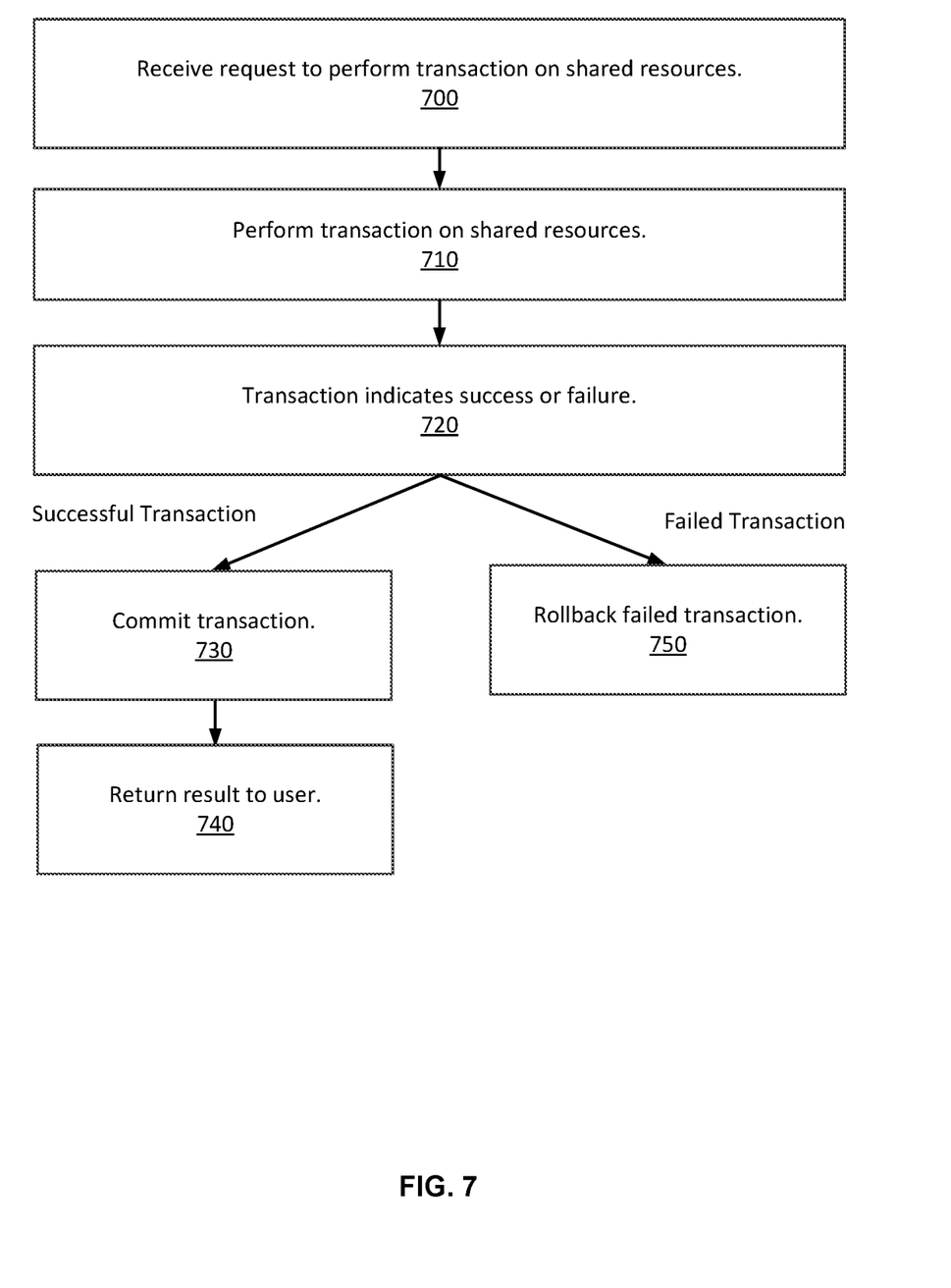
FIG. 7 is a flowchart illustrating a process for managing transactions on a distributed computing system in accordance with one embodiment.

FIG. 7 illustrates a process for managing transactions, according to one embodiment. In the embodiment illustrated in FIG. 7, the transaction manager receives 700 a request to perform a transaction on shared resources from a user request and performs 710 the transaction on the shared resources. If the transaction is successful, it indicates 720 a successful transaction to the transaction manager, commits 730 the transaction, and returns 740 a result to the user of the distributed computing system. Conversely, if the transaction is a failure, it indicates 720 a failed transaction and the rollback module rolls back 750 the failed transaction.

Example Management Computer

Figure 8:
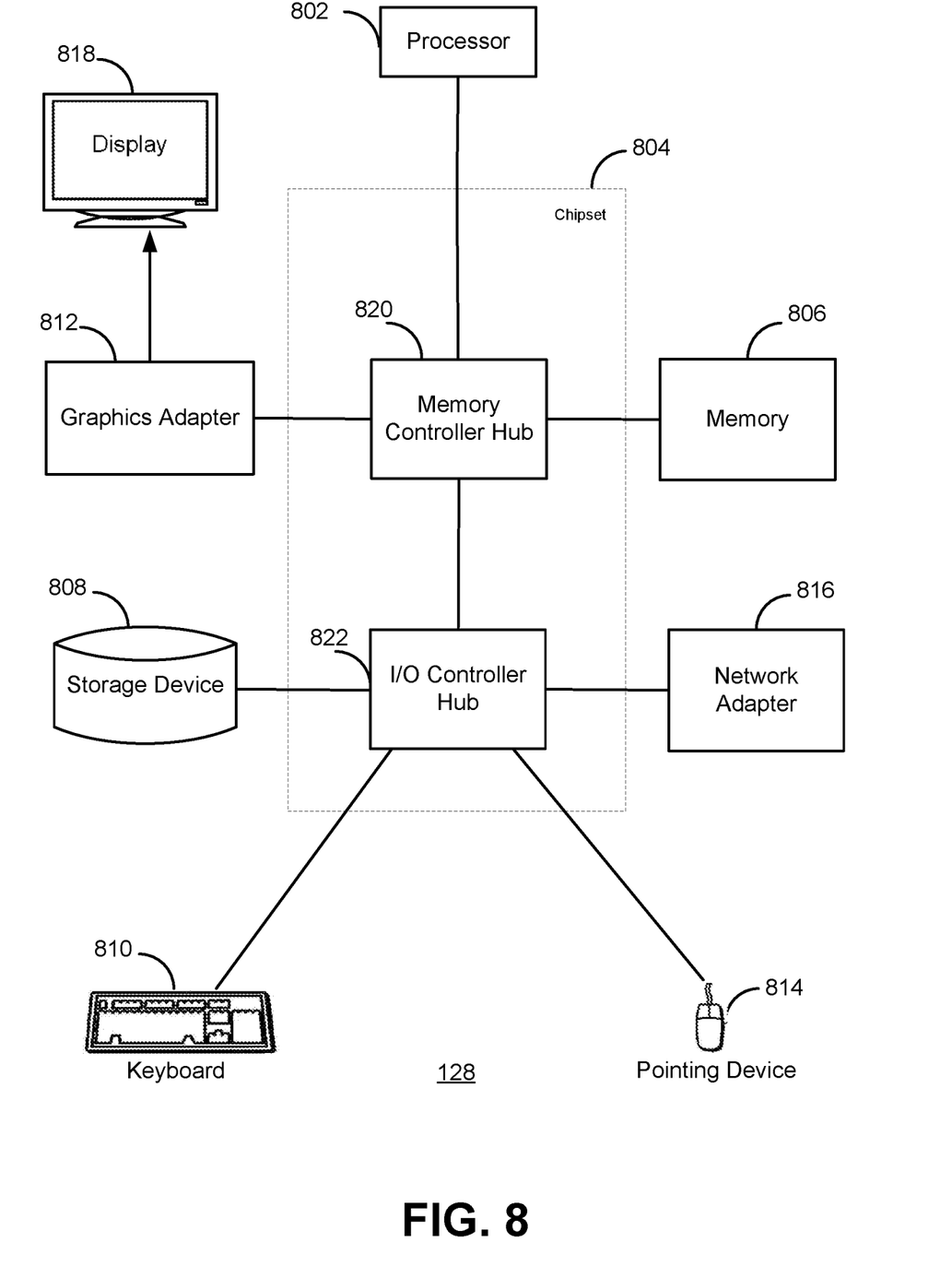
FIG. 8 is a block diagram illustrating a management computer in accordance with one embodiment.

FIG. 8 is a high-level block diagram illustrating an example of a management computer 800, according to one embodiment. Illustrated are at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display device 818 is coupled to the graphics adapter 812. A storage device 808, keyboard 810, pointing device 814, and network adapter 816 are coupled to the I/O controller hub 822. Other embodiments of the management computer 800 have different architectures. For example, the memory 806 is directly coupled to the processor 802 in some embodiments.

The storage device 808 includes one or more non-transitory computer-readable storage media such as a hard drive, compact disk read-only memory (CD-ROM), DVD, or a solid-state memory device. The memory 806 holds instructions and data used by the processor 802. The pointing device 814 is used in combination with the keyboard 810 to input data into the management computer 800. The graphics adapter 812 displays images and other information on the display device 818. In some embodiments, the display device 818 includes a touch screen capability for receiving user input and selections. The network adapter 816 couples the management computer 800 to the network 126. Some embodiments of the management computer 800 have different and/or other components than those shown in FIG. 8.

The management computer 800 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 808, loaded into the memory 806, and executed by the processor 802.

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating messaging directories and messaging members of those directories. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method for preventing deadlocks using a distributed computer system, the method comprising:
receiving, by a transaction manager, a request to perform one or more transactions on a shared resource, the shared resource having a plurality of copies, each copy of the plurality of copies located in one or more partitions;
modifying, by the transaction manager, a state of the shared resource based on each of the requested one or more transactions, the modifying changing the state of the shared resource from a first state to a second state;
indicating, by the transaction manager, whether each of the one or more transactions is successful or failed, the indicating based on the state of the shared resource;
responsive to indicating that a first transaction of the one or more transactions is successful:
applying, by the transaction manager, the first transaction to the plurality of copies;
committing, by the transaction manager, the shared resource and the plurality of copies; and
returning, by the transaction manager, a result associated with the modified shared resource; and
responsive to indicating that a second transaction of the one or more transactions is failed:
preventing, by the transaction manager, the second transaction from modifying the plurality of copies;
applying, by a rollback module, a rollback to the modified shared resource, the rollback reverting the state of the shared resource from the second state to the first state;
applying, by the rollback module, the rollback to the copies; and
indicating, by the rollback module, a successful rollback or a failed rollback.

2. The method of claim 1, wherein the one or more partitions allow a plurality of transactions to be performed in parallel on each copy of the plurality of copies.

3. The method of claim 1, wherein the modifying comprises:
generating, by a state manager, one or more resource handles, the one or more resource handles representing the shared resource;
generating, by the transaction manager, one or more behavior handles, each of the one or more behavior handles describing a behavior, the behavior changing a state of a shared resource from a first state to a second state; and
adding, by the transaction manager, the one or more behavior handles to one or more behavior stacks, the one or more behavior stacks located in the one or more resource handles.

4. The method of claim 3, wherein the behavior modifies one shared resource in a processing cycle.

5. The method of claim 3, further comprising:
clipping, by the transaction manager, the one or more behavior handles from the one or more behavior stacks, the one or more behavior handles having an invalidation, the invalidation based on a most recent behavior handle.

6. The method of claim 3, wherein at least one of the one or more behavior stacks is a LIFO data structure.

7. The method of claim 1, wherein the shared resource is at least one of a script resource, a template resource, or a schedule resource.

8. The method of claim 1, wherein each of the one or more transactions modifies a plurality of shared resources in a processing cycle.

9. The method of claim 1, wherein indicating that the second transaction is failed further comprises:
preventing, by the transaction manager, a modification for the plurality of copies; and preempting, by the transaction manager, results associated with the shared resource.

10. A non-transitory computer readable storage medium having instructions encoded thereon that, when executed by a processor, cause the processor to perform the steps including:
  receiving, by a transaction manager, a request to perform a transaction on a shared resource, the shared resource having a plurality of copies, each copy of the plurality of copies located in one or more partitions;
  modifying, by the transaction manager, a state of the shared resource based on the requested transaction, the modifying changing the state of the shared resource from a first state to a second state;
  indicating, by the transaction manager, a successful transaction or a failed transaction, the indicating based on the state of the shared resource;
  responsive to indicating the successful transaction:
    applying, by the transaction manager, the transaction to the plurality of copies;
    committing, by the transaction manager, the shared resource and the plurality of copies; and
    returning, by the transaction manager, a result associated with the modified shared resource; and
  responsive to indicating the failed transaction:
    preventing, by the transaction manager, the transaction from modifying the plurality of copies;
    applying, by a rollback module, a rollback to the modified shared resource, the rollback reverting the state of the shared resource from the second state to the first state;
    applying, by the rollback module, the rollback to the copies; and
    indicating, by the rollback module, a successful rollback or a failed rollback.

11. The non-transitory computer readable storage medium of claim 10, wherein the one or more partitions allow a plurality of transactions to be performed in parallel on each copy of the plurality of copies.

12. The non-transitory computer readable storage medium of claim 10, wherein the modifying comprises:
  generating, by a state manager, one or more resource handles, the one or more resource handles representing the shared resource;
  generating, by the transaction manager, one or more behavior handles, each of the one or more behavior handles describing a behavior, the behavior changing a state of a shared resource from a first state to a second state; and
  adding, by the transaction manager, the one or more behavior handles to one or more behavior stacks, the one or more behavior stacks located in the one or more resource handles.

13. The non-transitory computer readable storage medium of claim 12, wherein the behavior modifies one shared resource in a processing cycle.

14. The non-transitory computer readable storage medium of claim 12, further comprising:
  clipping, by the transaction manager, the one or more behavior handles from the one or more behavior stacks, the one or more behavior handles having an invalidation, the invalidation based on a most recent behavior handle.

15. The non-transitory computer readable storage medium of claim 12, wherein at least one of the one or more behavior stacks is a LIFO data structure.

16. The non-transitory computer readable storage medium of claim 10, wherein the shared resource is at least one of a script resource, a template resource, or a schedule resource.

17. The non-transitory computer readable storage medium of claim 10, wherein the transaction modifies a plurality of shared resources in a processing cycle.

18. The non-transitory computer readable storage medium of claim 10, wherein indicating the failed transaction further comprises:
  preventing, by the transaction manager, a modification for the plurality of copies; and
  preempting, by the transaction manager, results associated with the shared resource.

19. A system comprising:
  a computer processor; and
  a computer-readable storage medium coupled to the computer processor, the computer-readable storage medium storing executable code, the code when executed by the computer processor performs steps comprising:
    receiving, by a transaction manager, a request to perform a transaction on a shared resource, the shared resource having a plurality of copies, each copy of the plurality of copies located in one or more partitions;
    modifying, by the transaction manager, a state of the shared resource based on the requested transaction, the modifying changing the state of the shared resource from a first state to a second state;
    indicating, by the transaction manager, a successful transaction or a failed transaction, the indicating based on the state of the shared resource;
    responsive to indicating the successful transaction:
      applying, by the transaction manager, the transaction to the plurality of copies;
      committing, by the transaction manager, the shared resource and the plurality of copies; and
      returning, by the transaction manager, a result associated with the modified shared resource; and
    responsive to indicating the failed transaction:
      preventing, by the transaction manager, the transaction from modifying the plurality of copies;
      applying, by a rollback module, a rollback to the modified shared resource, the rollback reverting the state of the shared resource from the second state to the first state;
      applying, by the rollback module, the rollback to the copies; and
      indicating, by the rollback module, a successful rollback or a failed rollback.

20. The system of claim 19, wherein the modifying comprises:
  generating, by a state manager, one or more resource handles, the one or more resource handles representing the shared resource;
  generating, by the transaction manager, one or more behavior handles, each of the one or more behavior handles describing a behavior, the behavior changing a state of a shared resource from a first state to a second state; and
  adding, by the transaction manager, the one or more behavior handles to one or more behavior stacks, the one or more behavior stacks located in the one or more resource handles.

* * * * *